United States Patent
Saruwatari et al.

(10) Patent No.: US 9,647,252 B2
(45) Date of Patent: May 9, 2017

(54) NONAQUEOUS ELECTROLYTE BATTERY PACK WITH GAS-RELEASING PORTION FOR TRANSFERRING HEAT

(71) Applicant: KABUSHIKI KAISHA TOSHIBA, Minato-ku (JP)

(72) Inventors: Hidesato Saruwatari, Kashiwazaki (JP); Masanori Tanaka, Kashiwazaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 110 days.

(21) Appl. No.: 14/191,047

(22) Filed: Feb. 26, 2014

(65) Prior Publication Data
US 2014/0178724 A1 Jun. 26, 2014

Related U.S. Application Data

(63) Continuation of application No. PCT/JP2012/072241, filed on Aug. 31, 2012.

(30) Foreign Application Priority Data

Aug. 31, 2011 (JP) .................. 2011-188944

(51) Int. Cl.
*H01M 2/12* (2006.01)
*H01M 4/485* (2010.01)
(Continued)

(52) U.S. Cl.
CPC ....... *H01M 2/1241* (2013.01); *H01M 2/1282* (2013.01); *H01M 2/30* (2013.01);
(Continued)

(58) Field of Classification Search
None
See application file for complete search history.

(56) References Cited

U.S. PATENT DOCUMENTS

| 7,776,465 B1 | 8/2010 | Hatazawa et al. |
| 2003/0049519 A1 | 3/2003 | Ishida et al. |

(Continued)

FOREIGN PATENT DOCUMENTS

| CN | 1298212 A | 6/2001 |
| CN | 1399366 A | 2/2003 |

(Continued)

OTHER PUBLICATIONS

En Translation of JPH07192775 1995.*

(Continued)

*Primary Examiner* — Lucas J. O'Donnell
(74) *Attorney, Agent, or Firm* — Oblon, McClelland, Maier & Neustadt, L.L.P.

(57) ABSTRACT

According to one embodiment, a nonaqueous electrolyte battery includes a case member, a negative electrode terminal, an electrode group, a negative electrode lead, a rupture member, and a gas releasing portion. The electrode group is provided in the case member, and includes positive and negative electrodes. The negative electrode lead electrically connects the negative electrode terminal to the negative electrode. The gas releasing portion is provided in the case member, is able to transfer a heat from the negative electrode lead and includes a zeolite-based porous material.

13 Claims, 6 Drawing Sheets

(51) Int. Cl.
  *H01M 10/052* (2010.01)
  *H01M 10/058* (2010.01)
  *H01M 2/30* (2006.01)
  *H01M 2/34* (2006.01)

(52) U.S. Cl.
  CPC .......... *H01M 2/348* (2013.01); *H01M 4/485* (2013.01); *H01M 10/052* (2013.01); *H01M 10/058* (2013.01); *Y02P 70/54* (2015.11); *Y02T 10/7011* (2013.01)

(56) References Cited

U.S. PATENT DOCUMENTS

| 2005/0155217 | A1 | 7/2005 | Ishida et al. | |
|---|---|---|---|---|
| 2006/0168800 | A1 | 8/2006 | Ishida et al. | |
| 2010/0297490 | A1* | 11/2010 | Takami et al. | 429/131 |

FOREIGN PATENT DOCUMENTS

| JP | 07-192775 | 7/1995 |
|---|---|---|
| JP | 2001-155790 | 6/2001 |
| JP | 2001-202990 | 7/2001 |
| JP | 2003-077549 | 3/2003 |
| JP | 2003-151558 | 5/2003 |
| JP | 2008-146963 | 6/2008 |
| JP | 2010-205546 | 9/2010 |
| JP | 2012-190734 A | 10/2012 |
| WO | WO 2012/029669 A1 | 3/2012 |

OTHER PUBLICATIONS

1996 Kluwer Academic Publishers, "Composite Materials Based on Zeolite 4A for Adsorption Heat Pumps", Pino et al.*
JP07-192775A En machine translatino of the description of drawings—1995.*
Combined Office Action and Search Report issued May 27, 2015 in Chinese Patent Application No. 201280032357.7 (with English language translation).
International Search Report issued on Nov. 20, 2012 for PCT/JP2012/072241 filed on Aug. 31, 2012 with English Translation.
International Search Report issued on Nov. 22, 2011 for PCT/JP2011/069341 filed on Aug. 26, 2011 with English Translation.
International Written Opinion issued on Nov. 20, 2012 for PCT/JP2012/072241 filed on Aug. 31, 2012.
English translation of the International Preliminary Report on Patentability and Written Opinion issued Mar. 13, 2014 in PCT/JP2012/072241.
Office Action issued Feb. 1, 2016 in Chinese Patent Application No. 201280032357.7 (with English translation).

* cited by examiner

NONAQUEOUS ELECTROLYTE BATTERY PACK WITH GAS-RELEASING PORTION FOR TRANSFERRING HEAT

CROSS REFERENCE TO RELATED APPLICATIONS

This is a Continuation application of PCT Application No. PCT/JP2012/072241, filed Aug. 31, 2012, and is based upon and claims the benefit of priority from Japanese Patent Application No. 2011-188944, filed Aug. 31, 2011, the entire contents of all of which are incorporated herein by reference.

FIELD

Embodiments of the present invention relates to a nonaqueous electrolyte battery and a battery pack.

BACKGROUND

For a nonaqueous electrolyte battery, use of a zeolite-based porous material having absorptivity in order to remove residual water in the nonaqueous electrolyte solution is known. The main purpose of this is to suppress any side reactions other than the battery reaction by removing the moisture in the nonaqueous electrolyte battery, to improve the utilization efficiency, and to reduce the acid generated by hydrolysis of solutes in the nonaqueous electrolyte with residual water.

On the other hand, the zeolite-based porous material can adsorb various molecules such as those of a halogen gas, hydrogen sulfide gas, carbon dioxide, hydrocarbons, alcohols, and aromatic compounds besides water, though the kinds of the molecules to be absorbed by the zeolite-based porous material are depend on an effective diameter of molecules. Regarding the ability to absorb the various molecules, it is known to use the zeolite-based porous material to collect the gas generated by the side reaction other than the battery reaction.

When charging of the nonaqueous electrolyte battery is continued even after exceeding the rated capacity (so-called over-charge), heat is generated by electrochemical decomposition and heat degradation of the electrolyte solution, heat is generated by the chemical reaction of the electrode and the electrolyte solution, and heat is generated by heat degradation of an electrode active material itself. Accordingly, the battery may result in thermal runaway. In order to solve the problem, for a sealed type battery using a metal can for a case member, it is known to use a "rupture member" which releases the gas in the case member when the pressure in the battery is increased by the gas generated as a side reaction during over-charge and reaches a certain pressure. When the rupture member is opened, the outside air enters into the case member and thus the battery temperature is decreased, which prevents the possibility of thermal runaway occurring. When the open pressure of the rupture member is too low, it is feared that the rupture member will open at the time of usual use. On the other hand, when the open pressure of the rupture member is too high, the battery may result in thermal runaway before the rupture member opens.

DETAILED DESCRIPTION

According to an embodiment, a nonaqueous electrolyte battery includes a case member, a negative electrode terminal, an electrode group, a negative electrode lead, a rupture member, and a gas releasing portion. The case member has a can and a lid. The negative electrode terminal is provided in the case member. The electrode group is provided in the case member, and includes positive and negative electrodes. The negative electrode lead electrically connects the negative electrode terminal to the negative electrode. The rupture member is provided in the case member. The gas releasing portion is provided in the case member, is able to transfer a heat from the negative electrode lead and includes a zeolite-based porous material.

Hereinafter, the embodiments will be described with reference to the drawings.

(First Embodiment)

According to the first embodiment, there is provided a nonaqueous electrolyte battery including a case member, an electrode group, a negative electrode lead, a rupture member, and a gas releasing portion. The case member has a can and a lid provided on an opening of the can. A negative electrode terminal is provided in the can or the lid. The electrode group includes a positive electrode and a negative electrode and is provided in the case member. The negative electrode lead electrically connects the negative electrode terminal to the negative electrode. The rupture member is provided in the can or the lid. The gas releasing portion contains a zeolite-based porous material. The gas releasing portion is provided in the case member and is able to transfer the heat from the negative electrode lead.

Figure 1:
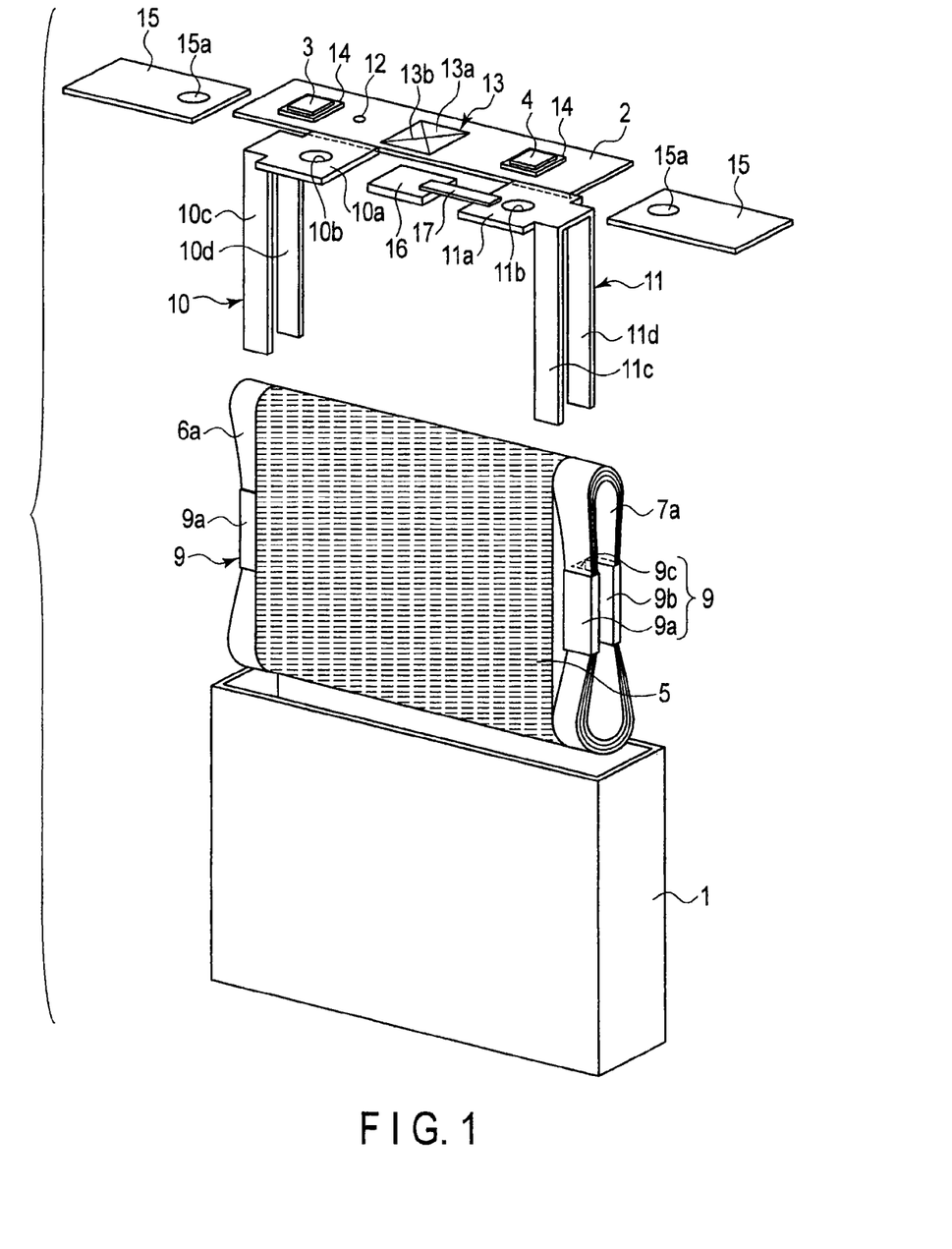
FIG. 1 is an exploded perspective view of a nonaqueous electrolyte battery according to a first embodiment.
Figure 3A:
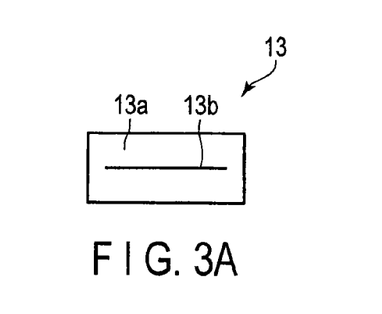
FIG. 3A is a plan view showing a modified example of a safety rupture member used for the nonaqueous electrolyte battery of FIG. 1.
Figure 3B:
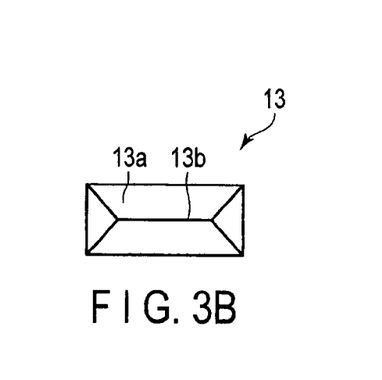
FIG. 3B is a plan view showing a modified example of a safety rupture member used for the nonaqueous electrolyte battery of FIG. 1.

FIGS. 1, 3A, and 3B show one example of the first embodiment. The battery shown in FIG. 1 is a sealed rectangular type nonaqueous electrolyte battery. The nonaqueous electrolyte battery comprises a can 1, a lid 2, a positive electrode external terminal 3, a negative electrode external terminal 4, and an electrode group 5. The case member is formed of the can 1 and the lid 2.

The can 1 has a prismatic shape with a bottom and is formed of, for example, a metal such as aluminium, an aluminium alloy, iron or stainless steel.

Figure 2:
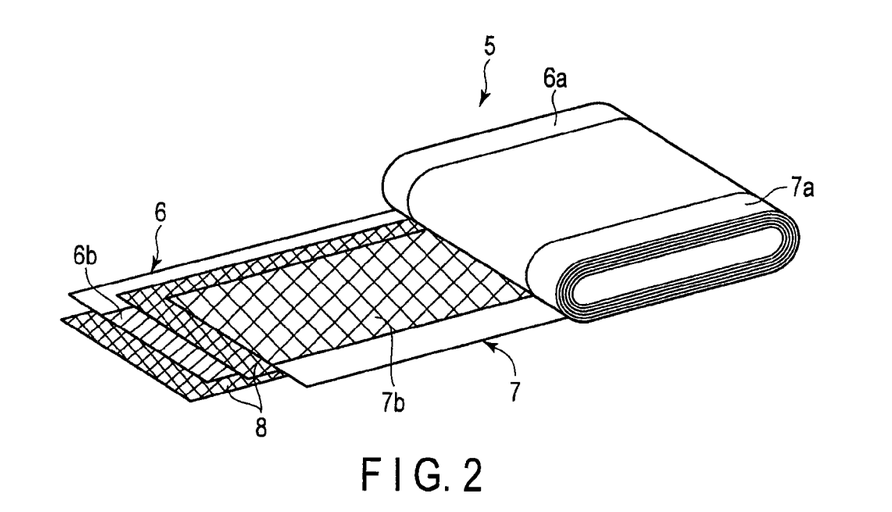
FIG. 2 is a partially expanded perspective view of an electrode group used for the nonaqueous electrolyte battery of FIG. 1.

As shown in FIG. 2, a flat type electrode group 5 is produced by winding a positive electrode 6 and a negative electrode 7 through a separator 8 between them so as to form a flat shape. The positive electrode 6 includes, for example, a rectangular positive electrode current collector of metal foil, a positive electrode tab 6a which is comprised of an end part parallel to the long side of the positive electrode current collector, and a positive electrode active material containing layer 6b formed on the positive electrode current collector excluding at least the portion of the positive electrode tab 6a. On the other hand, the negative electrode 7 includes, for example, a rectangular negative electrode current collector of metal foil, a negative electrode tab 7a which is comprised of an end part parallel to the long side of the negative electrode current collector, and a negative electrode active material containing layer 7b formed on the negative electrode current collector excluding at least the portion of the negative electrode tab 7a.

The positive electrode 6, the separator 8, and the negative electrode 7 are wound by shifting the positions of the positive electrode 6 and the negative electrode 7 so that the positive electrode tab 6a is projected from the separator 8 in the winding axis direction of the electrode group and the negative electrode tab 7a is projected from the separator 8 in the opposite direction thereto. As a result of this winding, in the electrode group 5, as shown in FIG. 2, the positive electrode tab 6a spirally wound is projected from one end surface, and the negative electrode tab 7a spirally wound is projected from the other end surface. The electrode group 5 is impregnated with an electrolyte solution (not shown).

As shown in FIG. 1, the positive electrode tab 6a and the negative electrode tab 7a are divided into two bundles at the portion near the winding center of the electrode group. A conductive holding member 9 comprises almost U-shaped first and second holding portions 9a and 9b, and a connecting portion 9c which electrically connects the first holding portion 9a to the second holding portion 9b. In the positive and negative electrode tabs 6a and 7a, one bundle is held by the first holding portion 9a and the other bundle is held by the second holding portion 9b.

The positive electrode lead 10 has an almost rectangular-shaped support plate 10a, a through hole 10b which is opened in the support plate 10a, and strip-shaped current collecting portions 10c and 10d which are extended downward from the support plate 10a. On the other hand, the negative electrode lead 11 has an almost rectangular-shaped support plate 11a, a through hole 11b which is opened in the support plate 11a, and strip-shaped current collecting portions 11c and 11d which are extended downward from the support plate 11a.

The holding member 9 is held between the current collecting portions 10c and 10d of the positive electrode lead 10. The current collecting portion 10c is disposed on the first holding portion 9a of the holding member 9. The current collecting portion 10d is disposed on the second holding portion 9b. The current collecting portions 10c and 10d, the first and second holding portions 9a and 9b, and the positive electrode tab 6a are joined, for example, by ultrasonic welding. Thus, the positive electrode 6 of the electrode group 5 and the positive electrode lead 10 are electrically connected through the positive electrode tab 6a.

The holding member 9 is held between the current collecting portions 11c and 11d of the negative electrode lead 11. The current collecting portion 11c is disposed on the first holding portion 9a of the holding member 9. On the other hand, the current collecting portion 11d is disposed on the second holding portion 9b. The current collecting portions 11c and 11d, the first and second holding portions 9a and 9b, and the negative electrode tab 7a are joined, for example, by ultrasonic welding. Thus, the negative electrode 7 of the electrode group 5 and the negative electrode lead 11 are electrically connected through the negative electrode tab 7a.

The material of the positive and negative electrode leads 10 and 11 and the holding member 9 is not particularly specified and it is preferably the same material as that of the positive and negative electrode external terminals 3 and 4. For example, in the case where the material of the external terminals is an aluminium or aluminium alloy, the material of the leads is preferably an aluminium or aluminium alloy. Further, in the case where the material of the external terminals is copper, the material of the leads is preferably copper.

A rectangular-plate-shaped lid 2 is seam-welded to the opening of the can 1, for example, by laser. The lid 2 is formed of a metal such as aluminium, an aluminium alloy, iron or stainless steel. The lid 2 and the can 1 are preferably formed of the same kind of metal. An injection port 12 of the electrolyte solution is opened in the lid 2 and it is sealed with a sealing lid (not shown) after injection of the electrolyte.

A rupture member 13 to be opened is provided near the center of the external surface of the lid 2. The rupture member 13 has a rectangular-shaped concave portion 13a provided on the external surface of the lid 2 and an X-shaped groove 13b provided in the concave portion 13a. The groove 13b is formed by, for example, press-molding of the lid 2 in the plate thickness direction. The shape of the groove 13b of the rupture member 13 is not limited to the one shown in FIG. 1. For example, it may be a straight line shape shown in FIG. 3A or a shape in which the ends of the straight line portion are branched into two as shown in FIG. 3B.

The positive and negative electrode external terminals 3 and 4 are disposed on both sides across the rupture member 13 on the external surface of the lid 2. An insulating gasket 14 is disposed between the positive and negative electrode external terminals 3 and 4 and the lid 2 to electrically insulate the positive and negative electrode external terminals 3 and 4 and the lid 2. Internal insulators 15 for positive and negative electrodes have respective through holes 15a and are disposed on the rear surface of the lid 2. One of the internal insulators 15 is disposed at the place corresponding to the positive electrode external terminal 3 on the rear surface of the lid 2, while the other of the internal insulators 15 is disposed at the place corresponding to the negative electrode external terminal 4 on the rear surface of the lid 2. The insulating gasket 14 and the internal insulators 15 are preferably resin-molded products.

The positive electrode external terminal 3 is fixed to the insulating gasket 14, the lid 2, the through hole 15a of the internal insulator 15, and the through hole 10b of the support plate 10a of the positive electrode lead 10 by caulking. Further, the negative electrode external terminal 4 is fixed to the insulating gasket 14, the lid 2, the through hole 15a of the internal insulator 15, and the through hole 11b of the support plate 11a of the negative electrode lead 11 by caulking. Thus, the positive and negative electrode external terminals 3 and 4 are fixed to the lid 2 in a state where insulation and airtightness are ensured. Further, the positive and negative electrode external terminals 3 and 4 are fixed to the positive and negative electrode leads 10 and 11 in a state where an electrical connection is ensured.

For a lithium ion secondary battery using a carbon-based material as the negative electrode active material, for example, an aluminium or aluminium alloy is used for the positive electrode external terminal 3. For example, a metal such as copper, nickel, or iron plated with nickel is used for the negative electrode external terminal 4. In the case where lithium titanate is used for the negative electrode active material, in addition to the above examples, an aluminium or aluminium alloy may be used for the negative electrode external terminal.

A gas releasing portion 16 contains a zeolite-based porous material. When the temperature of the gas releasing portion 16 increases to reach about 150° C., the gas releasing reaction becomes more dominant than the gas absorbing reaction. Thus, the gas is released. The gas releasing portion 16 has a rectangular pellet shape. The gas releasing portion 16 is disposed on the rear surface of the lid 2 and faces the rupture member 13. Heat conduction between the gas releasing portion 16 and the negative electrode lead 11 is performed through a heat conduction portion 17. The heat conduction portion 17 is formed of a rectangular sheet of heat conductive material. One end of the heat conduction portion 17 is disposed on the gas releasing portion 16, and the other end is disposed on the support plate 11a of the negative electrode lead 11. It suffices that the gas releasing portion 16 is in contact with the heat conduction portion 17, and it can be fixed to the heat conduction portion 17 with, for example, an adhesive. Further, it suffices that the heat conduction portion 17 is in contact with the support plate 11a of the negative electrode lead 11, and it can be fixed to the support plate 11a of the negative electrode lead 11 by, for example, welding. The welding process is not particularly limited and examples thereof include ultrasonic welding and laser welding.

The zeolite-based porous material contained in the gas releasing portion 16 is not particularly limited and one represented by Chemical formula: $Na_{12}[(AlO_2)_{12}(SiO_2)_{12}]\cdot 27H_2O$ (trade name: molecular sieve, 4A type) is preferred. This is because it is a good absorber of main components of the gas generated during over-charge such as carbon dioxide or hydrocarbons. Chemical formula: $Ca_{12}[(AlO_2)_{12}(SiO_2)_{12}]\cdot 27H_2O$ (trade name: molecular sieve, 5A type) and $Na_{86}[(AlO_2)_{86}(SiO_2)_{10}]\cdot 276H_2O$ (trade name: molecular sieve, 13X type) are preferred because they absorb main components of the gas generated during over-charge such as carbon dioxide or hydrocarbons. On the other hand, the effect of Chemical formula: $K_{12}[(AlO_2)_{12}(SiO_2)_{12}]\cdot 27H_2O$ (trade name: molecular sieve, 3A type) may be insufficient because it does not absorb carbon dioxide or hydrocarbons. The carbon dioxide and hydrocarbons are main components of the gas generated during over-charge.

More preferably, the gas releasing portion 16 contains a polyolefin resin which is mixed with the zeolite-based porous material. When the zeolite-based porous material is mixed with the polyolefin resin, the gas releasing portion 16 becomes an insulator and functions as a part of the insulating member. Thus, the gas releasing portion 16 can be disposed between the electrode group 5 and the lid 2 without a space, thereby preventing from reducing the energy density of the battery. The polyolefin resin is not particularly limited and examples thereof include polypropylene and polyethylene.

The weight of the zeolite-based porous material is preferably from 0.001 to 4% by weight based on 100% by weight of the total weight of the nonaqueous electrolyte battery. Thus, it is possible to further improve safety during over-charge without impairing the weight energy density of the battery. More preferably, the weight of the zeolite-based porous material is from 0.01 to 3% by weight.

It suffices that the gas releasing portion 16 is in contact with the rear surface of the lid 2 and it can be disposed away from the rear surface of the lid 2. In the case where a space is formed between the rear surface of the lid 2 and the gas releasing portion 16, in order to improve safety during over-charge, a distance between the gas releasing portion 16 and the rear surface of the lid 2 is preferably 5% or less when the height of the battery is 100%.

It is preferable to dispose a gas impermeable barrier layer on the surface, which is opposite to the surface facing the rupture member 13, of the gas releasing portion 16. It is possible to prevent the gas released from the gas releasing portion 16 from diffusing to places other than the rupture member 13, and it is possible to concentrate the gas released from the gas releasing portion 16 to the rupture member 13. Thus, the rupture member 13 can be immediately operated. The gas impermeable barrier layer can be formed on the opposite surface facing the rupture member 13 as well as the side surface of the gas releasing portion 16. The gas impermeable barrier layer is not particularly limited and examples thereof include metal foils.

The heat conductive material of the heat conduction portion 17 is not particularly limited, and preferable examples thereof include aluminium, a material containing aluminium as a main component, and nickel. Since aluminium is a light metal, the use of aluminium or the material containing aluminium as a main component allows an increase in the weight of the battery to be suppressed.

Figure 4:
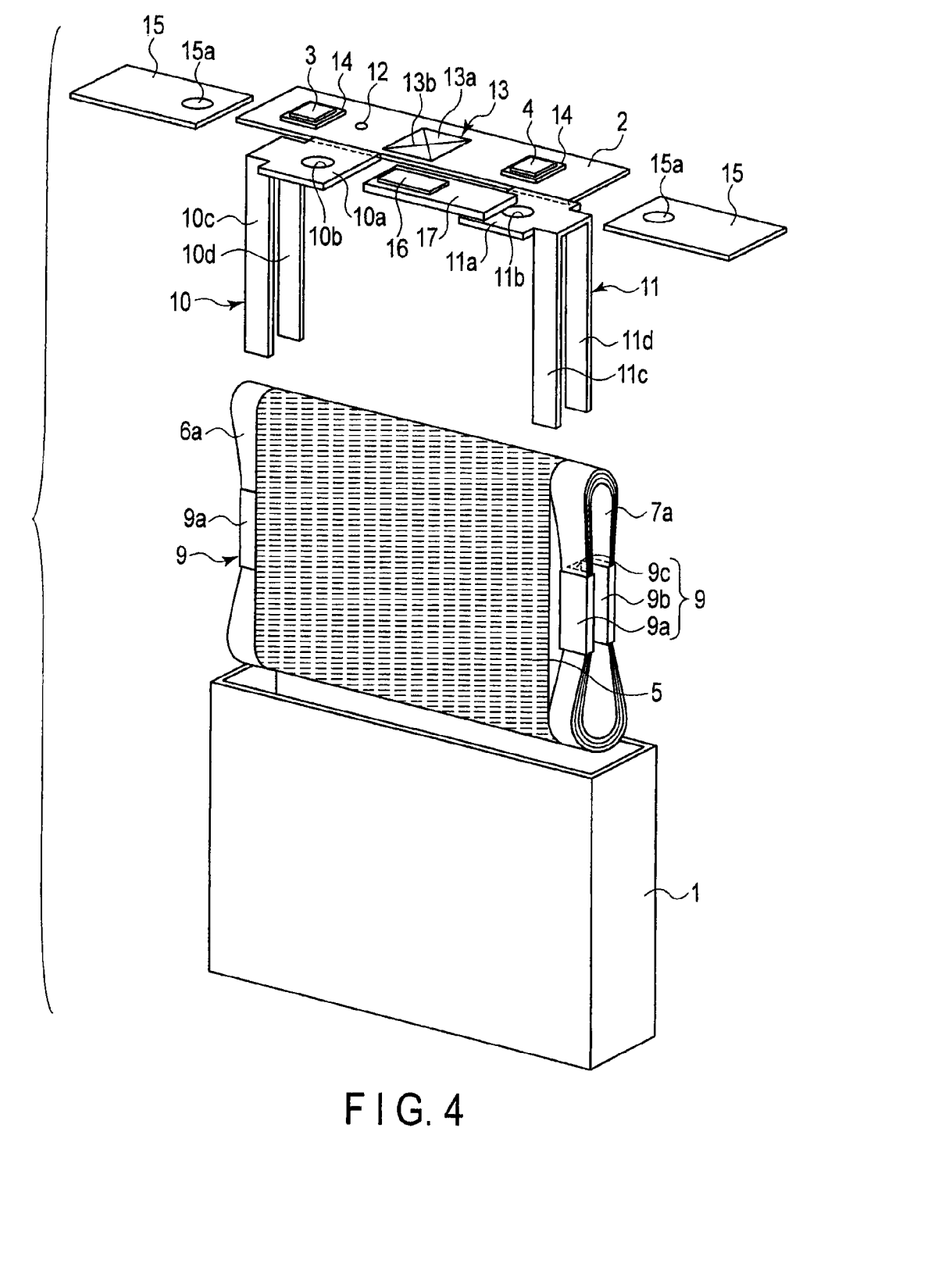
FIG. 4 is an exploded perspective view of another nonaqueous electrolyte battery according to the first embodiment.
Figure 5:
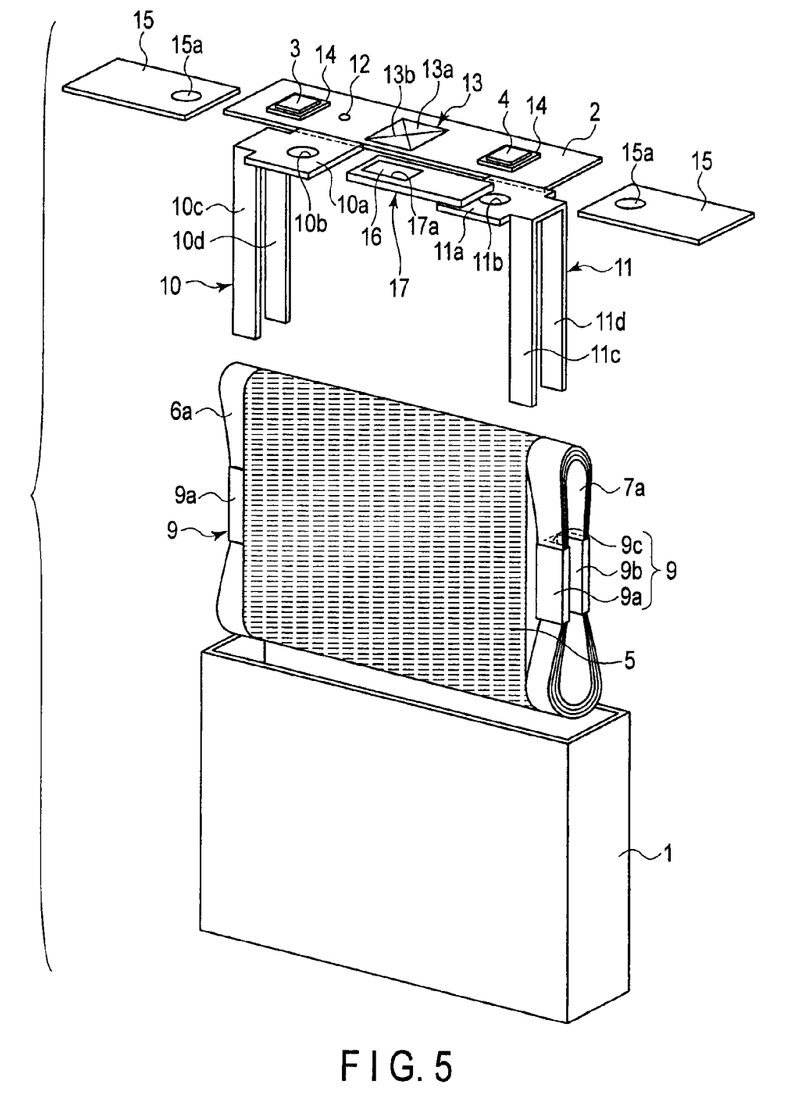
FIG. 5 is an exploded perspective view of another nonaqueous electrolyte battery according to the first embodiment.

In FIGS. 1 to 3A and 3B, the heat conduction portion 17 formed of a rectangular plate is used, however the shape of the heat conduction portion 17 is not limited thereto. For example, the heat conduction portion 17 having each of the shapes shown in FIGS. 4 and 5 can be used. In FIGS. 4 and 5, the same members in FIGS. 1 to 3A and 3B are identified by the same symbols, thereby omitting the repeated explanation thereof.

As shown in FIG. 4, the heat conduction portion 17 is formed of a thermally conductive material sheet having an area larger than that of the gas releasing portion 16. The gas releasing portion 16 is disposed on the heat conduction portion 17 to face the rupture member 13. The short side of the heat conduction portion 17 in which the gas releasing portion 16 is not disposed is disposed on the support plate 11a of the negative electrode lead 11. It suffices that the gas releasing portion 16 is in contact with the heat conduction portion 17, and it can be fixed to the heat conduction portion 17 with, for example, an adhesive. Further, it suffices that the heat conduction portion 17 is in contact with the support plate 11a of the negative electrode lead 11, and it can be fixed to the support plate 11a of the negative electrode lead 11 by, for example, welding. The welding process is not particularly limited and examples thereof include ultrasonic welding and laser welding.

As shown in FIG. 5, the heat conduction portion 17 is formed of a thermally conductive material plate which has a concave portion 17a to house the gas releasing portion 16. The gas releasing portion 16 is provided in the concave portion 17a of the heat conduction portion 17 to face the rupture member 13. The short side away from the concave portion 17a in the heat conduction portion 17 is disposed on the support plate 11a of the negative electrode lead 11. It suffices that the gas releasing portion 16 is in contact with the heat conduction portion 17, and it can be fixed to the heat conduction portion 17 with, for example, an adhesive. Further, it suffices that the heat conduction portion 17 is in contact with the support plate 11a of the negative electrode lead 11, and it can be fixed to the support plate 11a of the negative electrode lead 11 by, for example, welding. The welding process is not particularly limited and examples thereof include ultrasonic welding and laser welding.

In the batteries shown in FIGS. 4 and 5, the gas releasing portion 16 has the surface opposite to the surface facing the rupture member 13 (hereinafter, referred to as "non-facing surface"). The heat conduction portion 17 is disposed on the non-facing surface of the gas releasing portion 16. The heat conduction portion 17 provided on the non-facing surface of the gas releasing portion 16 can function as the gas impermeable barrier layer. As a result, it is possible to concentrate the gas released from the gas releasing portion 16 due to an increase in temperature to the rupture member 13. Thus, the rupture member 13 can be immediately operated. Thus, it is possible to further improve safety during over-charge.

In FIGS. 1 to 5, the gas releasing portion 16 is connected to the negative electrode lead 11 by the heat conduction portion 17. However, it is not limited thereto. For example, the gas releasing portion 16 can be directly disposed on the support plate 11a of the negative electrode lead 11. The shape of the gas releasing portion 16 is not limited to the rectangular pellet shape. For example, it may be a circular pellet or a polygonal pellet shape.

In FIGS. 1 to 5, the can and the lid are formed of metal. They can be formed of a resin such as polytetrafluoroethylene, a tetrafluoroethylene-perfluoroalkyl vinyl ether copolymer, a tetrafluoroethylene-hexafluoropropylene copolymer, a tetrafluoroethylene-ethylene copolymer, polychlorotrifluoroethylene resin or a chlorotrifluoroethylene-ethylene copolymer. The shape of the can is not limited to the rectangular-type and it may be, for example, a cylindrical shape.

Hereinafter, the positive electrode, the negative electrode, the separator, the nonaqueous electrolyte, and the like will be described.

1) Positive Electrode

The positive electrode includes a positive current collector and a positive electrode active material containing layer including a positive electrode active material, a conductive agent, and a binder, which is supported on one surface or both sides of the current collector.

The positive electrode is produced, for example, by adding a conductive agent and a binder to a positive electrode active material powder, suspending the mixture in an appropriate solvent, applying the slurry to the collector such as aluminum foil, drying it, and pressing it to form a rectangular electrode.

Examples of the positive electrode active material include various oxides and sulfides. Examples thereof include manganese dioxide ($MnO_2$), iron oxide, copper oxide, nickel oxide, lithium manganese composite oxide (e.g., $Li_xMn_2O_4$ or $Li_xMnO_2$), lithium nickel composite oxide (e.g., $Li_xNiO_2$), lithium cobalt composite oxide ($Li_xCoO_2$), lithium nickel cobalt composite oxide (e.g., $Li_xNi_{1-y-z}Co_yM_zO_2$ (M is at least one element selected from the group consisting of Al, Cr, and Fe), $0 \leq y \leq 0.5$, $0 \leq z \leq 0.1$), lithium manganese cobalt composite oxide (e.g., $Li_xMn_{1-y-z}Co_yM_zO_2$ (M is at least one element selected from the group consisting of Al, Cr, and Fe), $0 \leq y \leq 0.5$, $0 \leq z \leq 0.1$), lithium manganese nickel composite oxide (e.g., $Li_xMn_yNi_yM_{1-2y}O_2$ such as $Li_xMn_{1/3}Ni_{1/3}Co_{1/3}O_2$ or $Li_xMn_{1/2}Ni_{1/2}O_2$ (M is at least one element selected from the group consisting of Co, Cr, Al, and Fe), $1/3 \leq y \leq 1/2$), spinel-type lithium manganese nickel composite oxide (e.g., $Li_xMn_{2-y}Ni_yO_4$), lithium phosphorus oxide having an olivine structure (e.g., $Li_xFePO_4$, $Li_xFe_{1-y}Mn_yPO_4$, $Li_xCoPO_4$), iron sulfate (e.g., $Fe_2(SO_4)_3$), and vanadium oxide (e.g., $V_2O_5$). Examples thereof include conductive polymer materials, such as polyaniline and polypyrrole; disulfide-based polymer materials; and organic or inorganic materials such as sulfur (S) and carbon fluoride. In this regard, x, y, and z (not describing a preferable range above) are preferably from 0 to 1.

More preferable examples of the positive electrode active material include lithium manganese composite oxide, lithium nickel composite oxide, lithium cobalt composite oxide, lithium nickel cobalt composite oxide, lithium manganese nickel composite oxide, spinel-type lithium manganese nickel composite oxide, lithium manganese cobalt composite oxide, and lithium iron phosphate. According to these positive electrode active materials, a high battery voltage is obtained.

Examples of the conductive agent include carbon black, graphite, graphene, fullerenes, and cokes. Among them, carbon black and graphite are preferred. Examples of the carbon black include acetylene black, ketjen black, and furnace black.

Examples of the binder include polytetrafluoroethylene (PTFE), polyvinylidene fluoride (PVdF), and fluorine-based rubber.

As for the compounding ratio of the positive electrode active material, the conductive agent, and the binder, it is preferable that the content of the positive electrode active material is from 80 to 95% by weight, the content of the conductive agent is from 3 to 20% by weight, and the content of the binder is from 2 to 7% by weight.

The positive electrode current collector is preferably formed of aluminum foil or aluminum alloy foil. The average crystal grain size of the aluminum foil or aluminum alloy foil is preferably 50 µm or less. More preferably, it is 30 µm or less. Still more preferably, it is 5 µm or less. When the average crystal grain size is 50 µm or less, the strength of the aluminum foil or aluminum alloy foil can be dramatically increased. Thus, it becomes possible to densify the positive electrode by high pressure and the capacity of the battery can be increased.

The average crystal grain size is calculated as follows. The structure of the surface of the current collector is observed with an optical microscope and a number n of crystal grains present in a region of 1 mm×1 mm is calculated. An average crystal grain area S is calculated from $S = 1 \times 10^6 / n$ (µm$^2$) using the number n. An average crystal grain size d (µm) is calculated by assigning the obtained value of S to Equation (A) below.

$$d = 2(S/\pi)^{1/2} \quad (A)$$

The average crystal grain size of the aluminum foil or aluminum alloy foil is intricately influenced and changed by a plurality of factors such as structures of materials, impurities, processing conditions, heat treatment histories, and annealing conditions. The crystal grain size is adjusted by combining the various factors during the production process of the collector.

The thickness of the aluminum foil or aluminum alloy foil is preferably 20 µm or less, more preferably 15 µm or less. The purity of the aluminum foil is preferably 99% by mass or more. Preferable examples of the aluminium alloy include alloys containing elements, such as magnesium, zinc, and silicon. On the other hand, the content of transition metals such as iron, copper, nickel, and chromium is preferably 1% by mass or less.

2) Negative Electrode

The negative electrode includes a current collector and a negative electrode active material containing layer including a negative electrode active material, a conductive agent, and a binder, which is supported on one surface or both sides of the current collector. The negative electrode is produced, for example, by adding a conductive agent and a binder to a negative electrode active material powder, suspending the mixture in an appropriate solvent, applying the slurry to the collector, drying it, and pressing it to form a rectangular electrode.

As the collector, for example, a copper foil, aluminum foil, or aluminum alloy foil can be used. The aluminum foil or aluminum alloy foil forming the collector has preferably an average crystal grain size of 50 μm or less, more preferably 30 μm or less, still more preferably 5 μm or less. The average crystal grain size can be determined by the above method. When the average crystal grain size of the aluminum foil or aluminum alloy foil is 50 μm or less, the strength of the aluminum foil or aluminum alloy foil can be increased. Thus, the negative electrode active material containing layer can be densified by increasing the pressure during pressing and the capacity of the negative electrode can be increased. The dissolution and corrosive deterioration of the current collector in the over-discharge cycle in the high temperature environment (at 40° C. or more) can be prevented. Thus, an increase in negative electrode impedance can be suppressed. Further, output characteristics, rapid charging, and charge/discharge cycle characteristics can be improved.

The average crystal grain size of the aluminum foil or aluminum alloy foil is intricately influenced and changed by a plurality of factors such as structures of materials, impurities, processing conditions, heat treatment histories, and annealing conditions. The crystal grain size is adjusted by a combination of the various factors during the production process of the collector.

The thickness of the aluminum foil or aluminum alloy foil is preferably 20 μm or less, more preferably 15 μm or less. The purity of the aluminum foil is preferably 99% by mass or more. As the aluminium alloy, an alloy containing an element such as magnesium, zinc or silicon is preferred. The content of transition metals which are contained as alloy components, such as iron, copper, nickel, or chromium is preferably set to 1% by mass or less.

In the case where the aluminum foil is used for the current collector, aluminium is preferred as a thermally conductive material of the heat conduction portion 17. In the case where the copper foil is used for the current collector, nickel is preferred because the welding is easy.

Examples of the negative electrode active material include a lithium-titanium composite oxide. Examples of the lithium-titanium composite oxide include spinel-type lithium titanate represented by $Li_{4+x}Ti_5O_{12}$ (x changes in the range of −1≤x≤3 by charge-discharge reaction), ramsdellite-type $Li_{2+x}Ti_3O_7$ (x changes in the range of −1≤x≤3 by charge-discharge reaction), and a metal composite oxide containing Ti and at least one element selected from the group consisting of P, V, Sn, Cu, Ni, and Fe. Examples of the metal composite oxide containing Ti and at least one element selected from the group consisting of P, V, Sn, Cu, Ni, and Fe include $TiO_2$—$P_2O_5$, $TiO_2$—$V_2O_5$, $TiO_2$—$P_2O_5$—$SnO_2$, and $TiO_2$—$P_2O_5$-MeO (Me is at least one element selected from the group consisting Cu, Ni, and Fe). The metal composite oxides preferably have low crystallinity and a micro-structure in which crystal and amolphous phases coexist or an amolphous phase is present alone. The metal composite oxide having a micro-structure can significantly improve the cycle performance. The metal composite oxides are converted to lithium-titanium composite oxides by inserting lithium by charging. Among the lithium-titanium composite oxides, the spinel-type lithium titanate is preferred because it has excellent cycle characteristics.

Other examples of the negative electrode active material include carbonaceous materials and metal compounds.

Examples of the carbonaceous materials can include natural graphite, artificial graphite, coke, vapor-phase growth carbon fiber, mesophase pitch-based carbon fiber, spherical carbon, and resin-baked carbon. More preferable examples of the carbonaceous materials include vapor-phase growth carbon fiber, mesophase pitch-based carbon fiber, and spherical carbon. The carbonaceous material preferably has an interplanar spacing $d_{002}$ of 0.34 nm or less derived from (002) reflection according to the X-ray diffraction.

A metal sulfide and metal nitride can be used for a metallic compound. As the metal sulfide, titanium sulfide such as $TiS_2$, molybdenum sulfide such as $MoS_2$, and iron sulfides such as FeS, $FeS_2$, and $Li_xFeS_2$ can be used. As the metal nitride, lithium cobalt nitride such as $Li_sCo_tN$ (0<s<4, 0<t<0.5) can be used.

Examples of the conductive agent include carbon black, graphite, graphene, fullerenes, and cokes. Among them, carbon black and graphite are preferred. Examples of the carbon black include acetylene black, ketjen black, and furnace black.

Examples of the binder include polytetrafluoroethylene (PTFE), polyvinylidene fluoride (PVdF), fluorine-based rubber, and styrene butadiene rubber.

As for the compounding ratio of the negative electrode active material, the conductive agent, and the binder, it is preferable that the content of the negative electrode active material is from 73 to 96% by weight, the content of the conductive agent is from 2 to 20% by weight, and the content of the binder is from 2 to 7% by weight.

3) Separator

The separator is not particularly limited as long as it has insulation properties, and a porous film formed of a polymer such as polyolefin, cellulose, polyethylene terephthalate or vinylon or a non-woven fabric can be used. The materials of the separator may be used either singly or in combination of two or more.

4) Nonaqueous Electrolyte

The nonaqueous electrolyte contains a nonaqueous solvent and an electrolyte salt to be dissolved in the nonaqueous solvent. Further, a polymer may be contained in the nonaqueous solvent.

Examples of the electrolyte salt include lithium salts such as $LiPF_6$, $LiBF_4$, $Li(CF_3SO_2)_2N$ (bistrifluoromethanesulfonylamide lithium (popular name: LiTFSI)), $LiCF_3SO_3$ (popular name: LiTFS), $Li(C_2F_5SO_2)_2N$ (bispentafluoroethanesulfonylamide lithium (popular name: LiBETI)), $LiClO_4$, $LiAsF_6$, $LiSbF_6$, lithium bis-oxalatoborate (LiB$(C_2O_4)_2$ (popular name: LiBOB)), difluoro(oxalato)lithium borate ($LiF_2BC_2O_4$), and difluoro(trifluoro-2-oxide-2-trifluoro-methylpropionate(2-)-0,0) lithium borate ($LiBF_2$(OCOOC(CF$_3$)$_2$) (popular name: $LiBF_2$(HHIB))). These electrolyte salts may be used either singly or in combination of two or more. Particularly, $LiPF_6$ and $LiBF_4$ are preferred.

The concentration of the electrolyte salt is preferably from 1.5 M to 3 M. Thus, the performance when supplying a high load current can be improved.

The nonaqueous solvent is not particularly limited. Examples thereof include propylene carbonate (PC), ethylene carbonate (EC), 1,2-dimethoxyethane (DME), γ-butyrolactone (GBL), tetrahydrofuran (THF), 2-methyltetrahydrofuran (2-MeHF), 1,3-dioxolane, sulfolane, acetonitrile (AN), diethyl carbonate (DEC), dimethyl carbonate (DMC), methylethyl carbonate (MEC), and dipropyl carbonate (DPC). These solvents may be used either singly or in combination of two or more.

An additive may be added to the nonaqueous electrolyte. The additive is not particularly limited and examples thereof include vinylene carbonate (VC), vinylene acetate (VA), vinylene butyrate, vinylene hexanoate, vinylene crotonate, catechol carbonate, and propanesultone. The concentration of the additive is preferably from 0.1 to 3% by weight based on 100% by weight of the nonaqueous electrolyte. Still more preferably, it is from 0.5 to 1% by weight.

According to the first embodiment, a battery excellent in safety during over-charge can be obtained. The present inventors have conducted intensive studies. As a result, they have found that when the gas releasing portion including the zeolite-based porous material is provided in the case member and is able to transfer the heat from the negative electrode lead of the nonaqueous electrolyte battery, the rupture member can be opened during over-charge in the temperature range before the nonaqueous electrolyte battery results in thermal runaway, where the surface temperature of the nonaqueous electrolyte battery is around 70 to 80° C. in the over-charge test (the temperature varies depending on the shape of the battery), and it is possible to improve safety during over-charge. This is because carbon dioxide and hydrocarbons formed by oxidative decomposition of the nonaqueous electrolyte at an initial stage of over-charge are absorbed to the zeolite-based porous material, the heat caused by the chemical reaction of the negative electrode and the nonaqueous electrolyte is transferred to the zeolite-based porous material through the negative electrode lead, and then the rupture member is opened by the pressure generated by the adsorption gas released by the heat.

In this case, the gas releasing portion is preferably provided between the electrode group and the rupture member provided on the case member. When it is provided at this position, the rupture member can be efficiently exposed to the released gas. In order to efficiently expose the rupture member to the released gas, the gas releasing portion preferably faces the rupture member.

(Second Embodiment)

According to the second embodiment, there is provided a battery pack including a nonaqueous electrolyte battery. As the nonaqueous electrolyte battery, the nonaqueous electrolyte battery according to the first embodiment is used. The number of the nonaqueous electrolyte batteries (unit cells) included in the battery pack is one or more. When a plurality of the unit cells are included, each of the unit cells is electrically connected in series or in parallel.

Such a battery pack will be described in detail with reference to FIG. 6. The unit cells 21 are electrically connected to one another in series to form a battery module 22. A positive electrode lead 23 is connected to the positive electrode terminal of the battery module 22 and the distal end is inserted into a positive electrode connector 24 so as to be electrically connected. A negative electrode lead 25 is connected to the negative electrode terminal of the battery module 22 and the distal end is inserted into a negative electrode connector 26 so as to be electrically connected. The connectors 24 and 26 are connected to the protective circuit 29 through wirings 27 and 28.

The thermistor 30 detects the temperature of the unit cells 21 and the detection signal is sent to the protective circuit 29. The protective circuit 29 can shut down a plus wiring 32a and a minus wiring 32b between the protective circuit 29 and the energizing terminal 31 to an external instrument under a predetermined condition. For example, the predetermined condition indicates when the detection temperature of the thermistor 30 becomes more than a predetermined temperature. Further, the predetermined condition indicates when the overcharge, overdischarge, and over-current of the unit cells 21 are detected. The overcharge detection may be performed on each of the unit cells 21 or the battery module 22. When each of the unit cells 21 is detected, the cell voltage may be detected, or a positive electrode or negative electrode potential may be detected. In the case of the latter, a lithium electrode to be used as a reference electrode is inserted into each of the unit cells 21. In FIG. 6, wirings 33 for voltage detection are connected to the unit cells 21 and detection signals are sent to the protective circuit 29 through the wirings 33.

Figure 6:
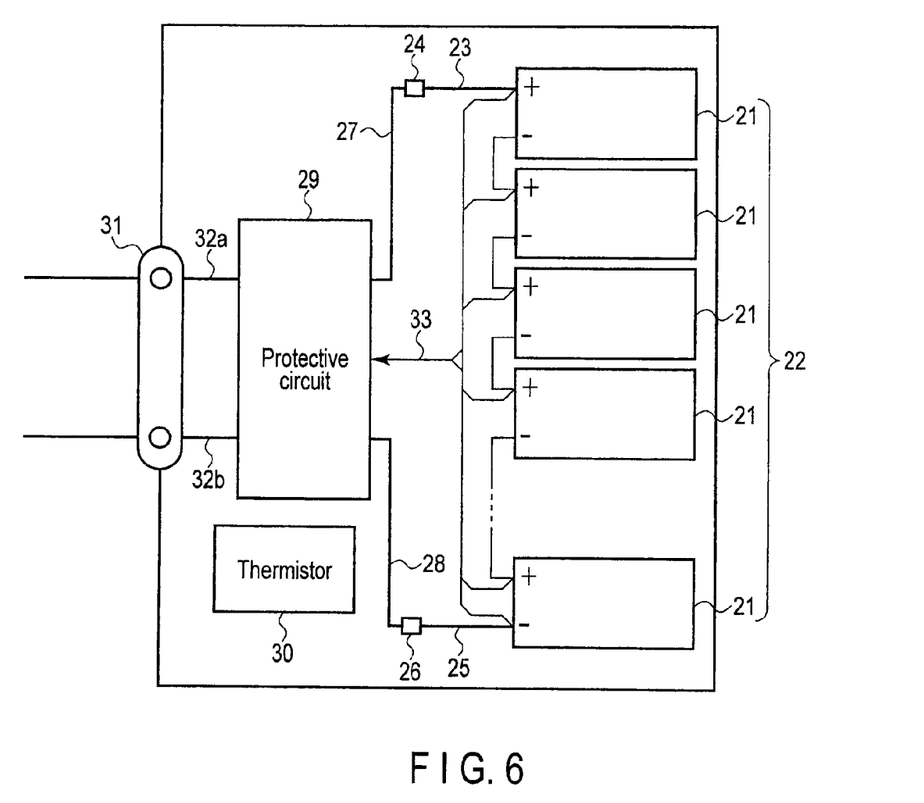
FIG. 6 is a block diagram showing an electric circuit of the battery pack according to the second embodiment.

In FIG. 6, the form in which the unit cells 21 are connected in series is shown. However, in order to increase the battery capacity, the cells may be connected in parallel. The assembled battery pack can be connected in series or in parallel.

The embodiments of the battery pack are appropriately changed according to the use. As the use of the battery pack, the use to expect good cycle characteristics and good high current characteristics is preferred. Specifically, the use of the battery pack for power sources for digital cameras, the use of the battery pack for vehicles such as two- or four-wheel hybrid electric vehicles, two- or four-wheel electric vehicles, and assisted bicycles or the like are listed. Particularly, automobile use is preferred.

According to the battery pack of the second embodiment described in detail above, the nonaqueous electrolyte battery in which the gas releasing portion including the zeolite-based porous material is provided in the case member so as to be able to transfer the heat from the negative electrode lead is included, and thus the rupture member can be opened during over-charge in the temperature range before the nonaqueous electrolyte battery results in thermal runaway and it is possible to improve safety during over-charge.

EXAMPLES

Hereinafter, the examples of the present invention will be described in detail with reference to the drawings.

Example A-1

<Production of Positive Electrode>

Eight percent by weight of graphite powder as a conductive agent based on the total amount of the positive electrode and 5% by weight of PVdF as a binder based on the total amount of the positive electrode were added to $LiCoO_2$ as a positive electrode active material. The mixture was dispersed in an n-methylpyrrolidone (NMP) solvent to prepare a slurry. The obtained slurry was applied to surfaces (except for one long side) of a current collector of a 15-μm-thick aluminum alloy foil, which was then treated through drying and pressing processes to produce a positive electrode having a density of 3.3 $g/cm^3$.

<Production of Negative Electrode>

Ten percent by weight of graphite as a conductive agent based on the total amount of the negative electrode and 3% by weight of PVdF as a binder based on the total amount of the negative electrode were added to $Li_4Ti_5O_{12}$ as a negative electrode active material. The mixture was dispersed in an n-methylpyrrolidone (NMP) solvent to prepare a slurry. The obtained slurry was applied to surfaces (except for one long side) of a current collector of a 15-μm-thick aluminum alloy foil, which was dried and pressed to produce a negative electrode having a density of 2.1 $g/cm_3$.

<Preparation of Nonaqueous Electrolyte>

One and a half moles of $LiPF_6$ was dissolved in a mixed solvent obtained by mixing PC and DEC at a volume ratio (PC:DEC) of 1:2 to obtain a nonaqueous electrolyte.

<Production of Gas Releasing Portion>

Three grams (corresponding to 0.6% by weight based on 100% by weight of the nonaqueous electrolyte battery) of molecular sieve (4A type) as a zeolite-based porous material was molded into a rectangular pellet shape to obtain a gas releasing portion.

<Assembly of Battery>

A 20-μm-thick separator of a polyethylene porous film was impregnated with the nonaqueous electrolyte. Then, the positive electrode was covered with the separator. The negative electrode was superimposed thereon through the separator to face the positive electrode, followed by spirally winding to produce a spiral electrode group. The electrode group was pressed to be molded into a flat shape. The electrode group molded into a flat shape was inserted into a 0.3-mm-thick aluminium can-shaped case (exterior can). A gas releasing portion was disposed between a lid and the electrode group to face a rupture member. A space between the rupture member and the gas releasing portion was 2 mm (corresponding to 2%, when taking the height of the battery as 100%). The end of a heat conduction portion formed of a rectangular aluminum plate was adhered to the gas releasing portion with an adhesive. The other end was welded to a support plate of a negative electrode lead. Thus, a flat-shaped nonaqueous electrolyte battery having a thickness of 20 mm, a width of 120 mm, a height of 100 mm, and a weight of 500 g shown in FIG. 1 was produced.

Example A-2

A flat-shaped nonaqueous electrolyte battery (weight: 502 g) was produced in the same manner as Example A-1 except that a gas releasing portion 16 was disposed on a heat conduction portion 17 as shown in FIG. 4.

Example A-3

A flat-shaped nonaqueous electrolyte battery (weight: 501 g) was produced in the same manner as Example A-1 except that a gas releasing portion 16 was housed in a concave portion 17a of a heat conduction portion 17 as shown in FIG. 5.

Example A-4

A flat-shaped nonaqueous electrolyte battery was produced in the same manner as Example A-1 except that a space between a rupture member and a gas releasing portion was set to 0 mm.

Example A-5

A flat-shaped nonaqueous electrolyte battery was produced in the same manner as Example A-1 except that a space between a rupture member and a gas releasing portion was 5 mm (corresponding to 5% when taking the height of the battery as 100%.

Example A-6

A flat-shaped nonaqueous electrolyte battery was produced in the same manner as Example A-1 except that a space between a rupture member and a gas releasing portion was 10 mm (corresponding to 10% when taking the height of the battery as 100%.

Example A-7

A battery was produced in the same manner as Example A-1 except that a molecular sieve (3A type) was used.

Example A-8

A battery was produced in the same manner as Example A-1 except that a molecular sieve (5A type) was used.

Comparative Example A-1

A battery (497 g) was produced in the same manner as Example 1 except that a gas releasing portion and a heat conduction portion were not disposed.

Comparative Example A-2

Five percent by weight of graphite powder as a conductive agent based on the total amount of the positive electrode, 5% by weight of PVdF as a binder based on the total amount of the positive electrode, and 3% by weight of molecular sieve (4A type) based on the total amount of the positive electrode were added to $LiCoO_2$ as a positive electrode active material. The mixture was dispersed in an n-methylpyrrolidone (NMP) solvent to prepare a slurry. The obtained slurry was applied to surfaces (except for one long side) of a 15-μm-thick aluminum alloy foil, which was then treated through drying and pressing processes to produce a positive electrode having a density of 3.3 $g/cm^3$. A flat-shaped nonaqueous electrolyte battery was produced in the same manner as Example A-1 except that the obtained positive electrode was used and a gas releasing portion and a heat conduction portion were not disposed.

Comparative Example A-3

A flat-shaped nonaqueous electrolyte battery was produced in the same manner as Example A-1 except that a film having a 3-μm-thick molecular sieve (4A type) layer on a 17-μm-thick polyethylene porous film was used for a separator, and a gas releasing portion and a heat conduction portion were not disposed.

Comparative Example B-1

Figure 7:
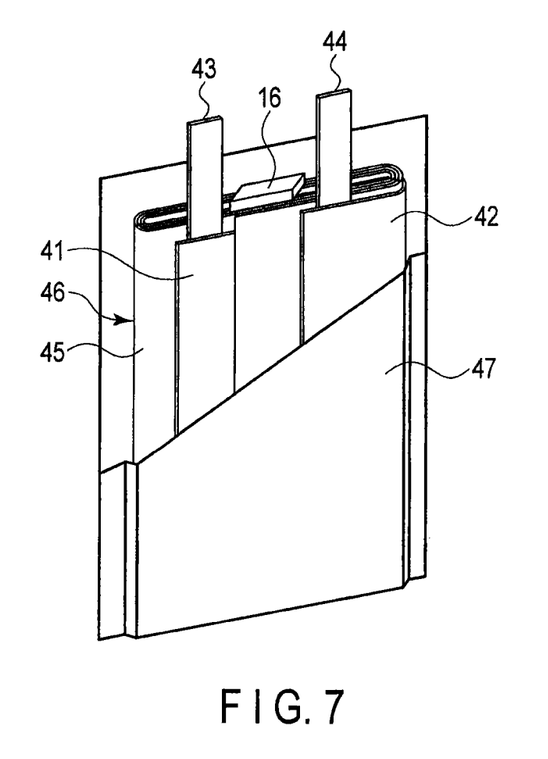
FIG. 7 is a partially cut perspective view of a nonaqueous electrolyte battery of Comparative example.

A flat-shaped nonaqueous electrolyte battery shown in FIG. 7 was produced. A positive electrode 41 was produced in the same manner as Example A-1 except that a positive electrode tab was not formed on the long side. A negative electrode 42 was produced in the same manner as Example A-1 except that a negative electrode tab was not formed on the long side. Rectangular positive and negative electrode tabs 43 and 44 were welded to the positive and negative electrodes 41 and 42 thus obtained. An electrode group 46 was produced in the same manner as Example A-1, using the positive and negative electrodes 41 and 42 and a separator 45 which was the same as Example A-1.

A gas releasing portion 16 which was the same as Example A-1 was disposed on the end surface of the electrode group 46 thus obtained where the positive and negative electrode tabs 43 and 44 were pulled out. These items were sealed in a case member formed of an aluminium-containing laminate film to produce a flat-shaped nonaqueous electrolyte battery shown in FIG. 7.

Comparative Example B-2

A flat-shaped nonaqueous electrolyte battery was produced in the same manner as Comparative example B-1 except that a gas releasing portion 16 was not used.

These batteries were subjected to a test of over-charging up to an SOC of 200% at an electric current value of 1 C. The surface temperature of each of the batteries when the rupture member is opened at this time and the weight of each of the batteries after the test are shown in Table 1. The weight of each of the batteries before the test is written in Table 1.

TABLE 1

|  | Space (mm) | Zeolite-based porous material | Weight before test [g] | Weight after test [g] | Surface temperature [° C.] at the time of opening the rupture member |
|---|---|---|---|---|---|
| Example A-1 | 2 | Molecular sieve (4A type) | 500 | 498 | 75 |
| Example A-2 | 2 | Molecular sieve (4A type) | 502 | 499 | 72 |
| Example A-3 | 2 | Molecular sieve (4A type) | 501 | 500 | 71 |
| Example A-4 | 0 | Molecular sieve (4A type) | 500 | 499 | 74 |
| Example A-5 | 5 | Molecular sieve (4A type) | 500 | 497 | 78 |
| Example A-6 | 10 | Molecular sieve (4A type) | 500 | 492 | 81 |
| Example A-7 | 2 | Molecular sieve (3A type) | 500 | 490 | 83 |
| Example A-8 | 2 | Molecular sieve (5A type) | 500 | 494 | 78 |
| Comparative example A-1 | — | — | 497 | 470 | 95 |
| Comparative example A-2 | — | Molecular sieve (4A type) | 497 | 465 | 97 |
| Comparative example A-3 | — | Molecular sieve (4A type) | 497 | 468 | 95 |
| Comparative example B-1 | — | Molecular sieve (4A type) | 450 | 390 | 92 |
| Comparative example B-2 | — | — | 447 | 392 | 93 |

Regarding the battery of Example A-1, the rupture member was opened when the battery surface temperature was 75° C. and the weight of the battery after the test was 498 g. On the other hand, regarding the battery of Comparative example A-1, the rupture member was opened when the battery surface temperature was 95° C. The gas assumed to be the electrolyte solution boiled at that time was observed. The weight of the battery after the test was 470 g. It was suggested that safety was improved by providing the gas releasing portion.

From comparison among Examples A-1, A-2, and A-3, it is found that safety is improved in Examples A-2 and A-3 where the gas impermeable barrier layer is disposed on the non-facing surface of the gas releasing portion.

From comparison among Examples A-1, A-4, A-5, and A-6, it is found that the distance between the gas releasing portion and the rupture member is correlated with safety, and the distance is preferably from 0 to 5% when taking the height of the battery as 100% (Examples A-1, A-4, and A-5).

From comparison among Examples A-1, A-7, and A-8, it is found that the kind of the molecular sieve is preferably the 4A type (example A-1).

From comparison among Example A-1 and Comparative examples A-2 and A-3, it is found that even if the zeolite-based porous material is disposed on the electrode or the separator, this results in no effect on improvement in safety. This is because when the zeolite-based porous material is disposed on the electrode or the separator, the electrode group is expanded by the gas released from the zeolite-based porous material, and the rupture member cannot be operated immediately.

From comparison between Comparative examples B-1 and B-2, it is found that, when the case member is formed of a laminate film, the use of the zeolite-based porous material has no effect on improvement in safety. In order to open the case member formed of a laminate film with an increase in the pressure in the battery, it is necessary to increase the overall pressure in the case member. The pressure in the battery cannot be increased overall by releasing the gas from the zeolite-based porous material. Thus, the case member formed of a laminate film cannot be opened, which results in no improvement in safety during over-charge.

According to at least one embodiment described above, the gas releasing portion including the zeolite-based porous material is provided so as to be able to transfer the heat from the negative electrode lead of the nonaqueous electrolyte battery and thus it is possible to improve safety.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising:
    a case member having a can and a lid;
    a negative electrode terminal which is provided in the case member;

an electrode group which is provided in the case member and includes positive and negative electrodes;

a negative electrode lead which electrically connects the negative electrode terminal to the negative electrode;

a rupture member which is provided on an external surface of the lid and consists of a concave portion provided on the external surface of the lid and a groove provided in the concave portion; and a gas releasing portion which is provided in the case member, comprises a zeolite-based porous material, and transfers heat from the negative electrode lead to the zeolite-based porous material to release gas from the zeolite-based porous material, wherein the gas releasing portion faces the rupture member.

2. The nonaqueous electrolyte battery according to claim 1, further comprising a heat conduction portion comprising aluminium and connecting the negative electrode lead to the gas releasing portion.

3. The nonaqueous electrolyte battery according to claim 2, wherein the zeolite-based porous material is represented by Chemical formula:

$Na_{12}[(AlO_2)_{12}(SiO_2)_{12}]\cdot 27H_2O$.

4. The nonaqueous electrolyte battery according to claim 3, wherein the gas releasing portion further comprises a polyolefin resin.

5. The nonaqueous electrolyte battery according to claim 3, wherein a weight of the zeolite-based porous material is from 0.001 to 4% by weight based on 100% by weight of a weight of the nonaqueous electrolyte battery.

6. The nonaqueous electrolyte battery according to claim 1, wherein the negative electrode comprises a lithium-titanium composite oxide.

7. A battery pack comprising the nonaqueous electrolyte battery according to claim 1.

8. The nonaqueous electrolyte battery according to claim 1, further comprising a heat conduction portion which contacts with both of the negative electrode lead and the gas releasing portion.

9. The nonaqueous electrolyte battery according to claim 8, wherein the heat conduction portion is a sheet of a heat conductive material.

10. The nonaqueous electrolyte battery according to claim 1, wherein the gas releasing portion is provided between the electrode group and the rupture member.

11. The nonaqueous electrolyte battery according to claim 1, wherein the gas releasing portion contacts with the negative electrode lead.

12. The nonaqueous electrolyte battery according to claim 1, further comprising a sheet of heat conductive material connecting the negative electrode lead to the gas releasing portion.

13. The nonaqueous electrolyte battery according to claim 12, wherein the sheet of heat conductive material is an aluminum plate.

* * * * *

UNITED STATES PATENT AND TRADEMARK OFFICE
CERTIFICATE OF CORRECTION

PATENT NO. : 9,647,252 B2
APPLICATION NO. : 14/191047
DATED : May 9, 2017
INVENTOR(S) : Hidesato Saruwatari et al.

Page 1 of 1

It is certified that error appears in the above-identified patent and that said Letters Patent is hereby corrected as shown below:

On the Title Page

Item (54), and in the Specification, Column 1, Lines 1-3 the Title information should read:
--NONAQUEOUS ELECTROLYTE BATTERY AND BATTERY PACK WITH GAS-RELEASING PORTION FOR TRANSFERRING HEAT--

Signed and Sealed this
Thirty-first Day of July, 2018

Andrei Iancu
*Director of the United States Patent and Trademark Office*